United States Patent [19]
Covarrubias

[11] 3,892,253
[45] *July 1, 1975

[54] SHEAR VALVE WITH FRANGIBLE FITTING

[75] Inventor: George Salvador Covarrubias, La Puente, Calif.

[73] Assignee: C. B. F. Systems Inc., Covina, Calif.

[ * ] Notice: The portion of the term of this patent subsequent to Sept. 11, 1990, has been disclaimed.

[22] Filed: July 20, 1973

[21] Appl. No.: 380,946

[52] U.S. Cl. .................. 137/68; 222/5; 251/273
[51] Int. Cl. .................. F16k 13/06; B67b 7/00
[58] Field of Search ................ 137/67–71; 220/47, 89 A; 222/5; 251/324, 325

[56] References Cited
UNITED STATES PATENTS

| | | | |
|---|---|---|---|
| 2,441,011 | 5/1948 | Dodelin | 222/5 |
| 2,777,455 | 1/1957 | Daudelin | 137/68 |
| 3,202,162 | 8/1965 | Eckardt et al. | 220/47 X |
| 3,216,438 | 11/1965 | Prono et al. | 137/68 |
| 3,757,810 | 9/1973 | Covarrubias | 137/68 |

FOREIGN PATENTS OR APPLICATIONS 798,641 7/1958 United Kingdom ............ 251/324

Primary Examiner—Martin P. Schwadron
Assistant Examiner—Richard Gerard
Attorney, Agent, or Firm—Heilman, Heilman & Casella

[57] ABSTRACT

An improved frangible disc valve which may be operated manually by explosive charge, by gaseous or hydraulic pressure, by the release of a compressed spring, by a solenoid, or by any conventional method of creating a rotary motion. The valve includes a frangible fitting made of a single piece of metal so as to be leakproof. When the valve is opened, a metal disc is sheared and carried away from the fitting by the piston. An unobstructed passageway in the piston is then placed in line with the valve inlet and outlet allowing free access to the discharge of the controlled medium; the controlled medium being either liquid, a gas, or a semisolid. A pilot rod extends from the operating piston through a guide hole to insure proper alignment, and also provides a positive indication of the open or closed condition of the valve. Simultaneously, a detent piece is driven into a cavity in the piston by a compressed spring. This action locks the piston into the fully open position and retains the hollow cylinder in axial alignment.

Alternatively, an external nut can be operated to break the frangible portion, after which a compressed spring completes the operation to carry the piston to the locked open position.

15 Claims, 5 Drawing Figures

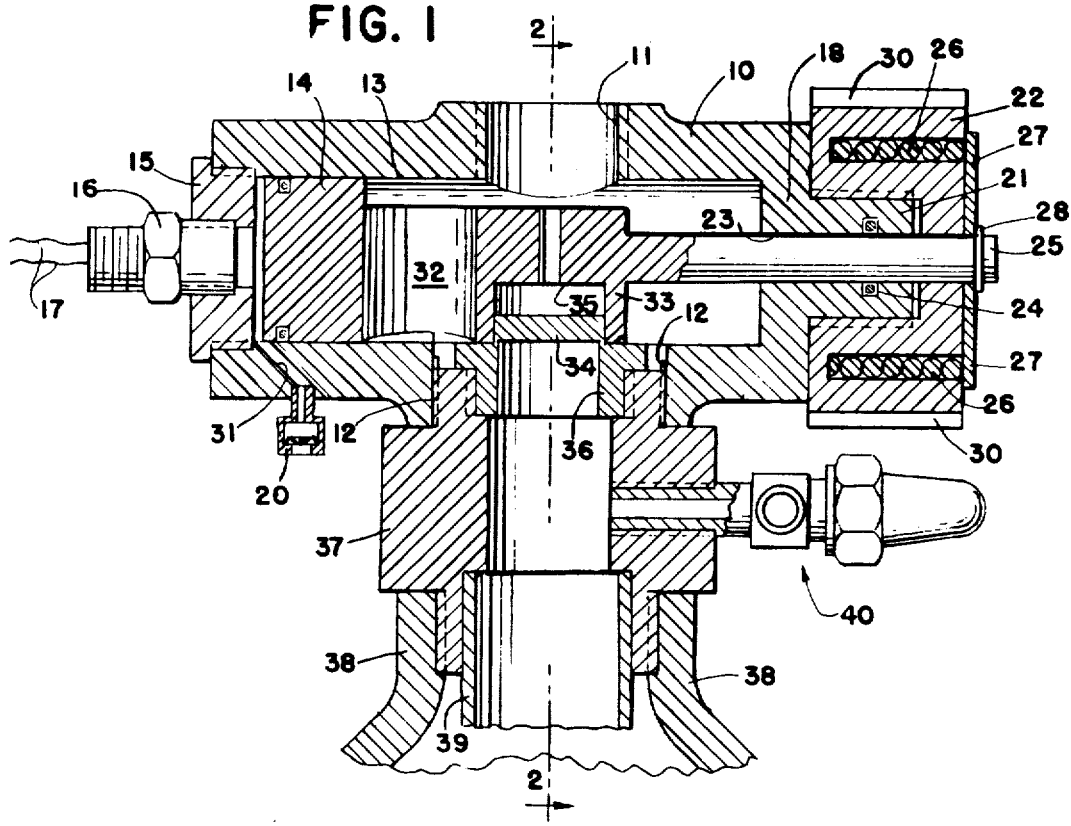
FIG. 1
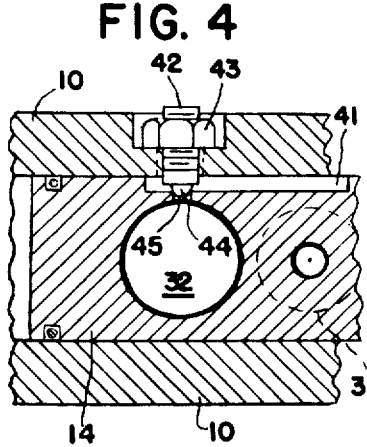
FIG. 4
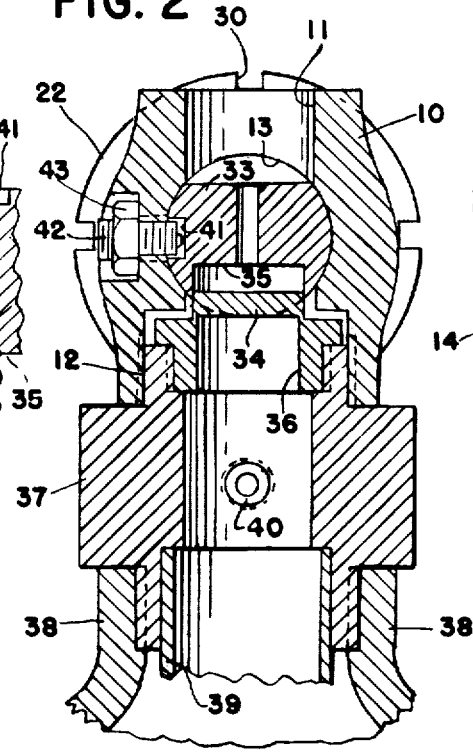
FIG. 2
FIG. 3

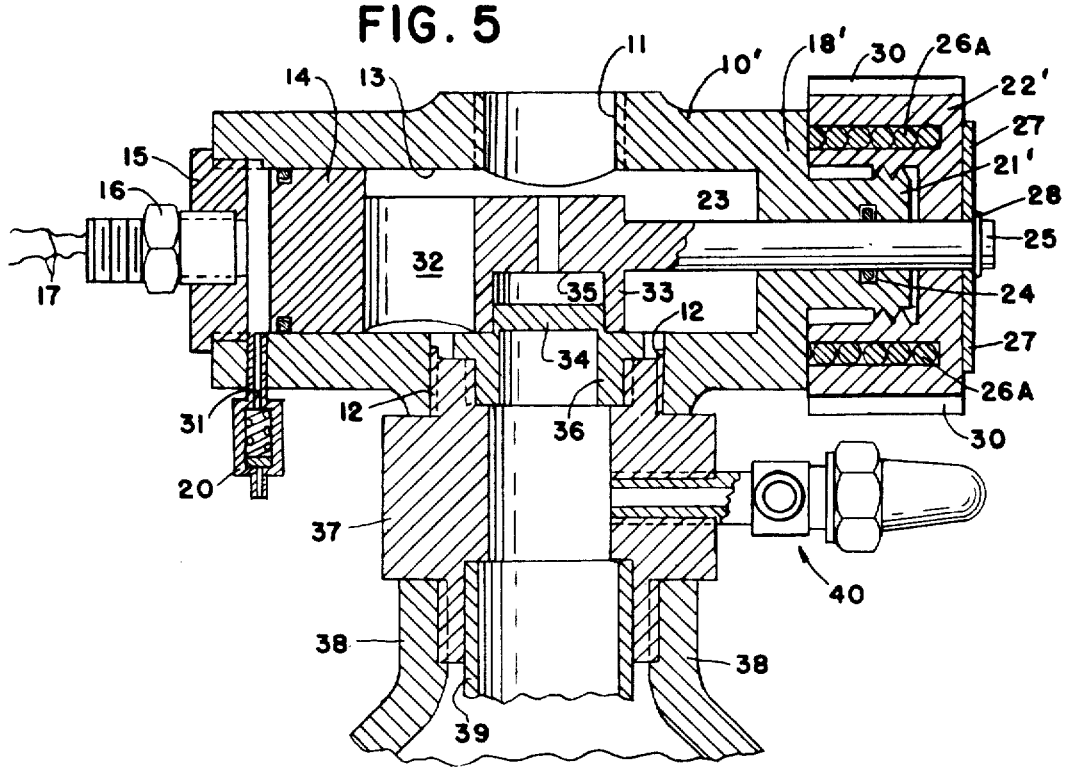

SHEAR VALVE WITH FRANGIBLE FITTING

PRIOR APPLICATION

This application is an improvement on applicant's copending application Ser. No. 217,013, filed Jan. 11, 1972, U.S. Pat. No. 3,757,810, which is incorporated herein by reference.

This invention pertains to an improved frangible disc vlave which may be operated manually by explosive charge, by gaseous or hydraulic pressure, by the release of a compressed spring, by a solenoid, or by any conventional method of creating a rotary motion. The valve includes a frangible fitting made of a single piece of metal so as to be leakproof. When the valve is opened, a metal disc is sheared and carried away from the fitting by the piston. An unobstructed passageway in the piston is then placed in line with the valve inlet and outlet allowing free access to the discharge of the controlled medium; the controlled medium being a liquid, a gas, or a semisolid. A pilot rod extends from the operating piston through a guide hole to insure proper alignment, and also to provide a positive indication of the open or closed condition of the valve. Simultaneously, a detent piece is driven into a cavity in the piston by a compressed spring. This action locks the piston into the fully open position and retains the hollow cylinder in axial alignment.

Alternatively, an external nut can be operated to break the frangible portion, after which a compressed spring completes the operation to carry the piston to the locked open position.

BACKGROUND OF THE INVENTION

The present invention specifically is directed for use with high pressure containers of fire-fighting fluid, such as liquid carbon dioxide, but its use is not limited to this application. The requirements for such a valve are: (a) fast opening, either by manual or automatic control; (b) unobstructed straight through passageway for the fluid when the valve is opened, with minimum development of back pressure in the controlled medium; (c) no tendency to leak, even after storage of several years; and (d) positive indication of discharge.

The present invention provides such a valve, and in addition, has provision for a rapid and inexpensive replacement of the frangible fitting after a valve opening.

Another object of the invention is the provision of a manually operable nut and spring combination which permits an operator to start the operation of opening the valve and then relies on a compression spring to finish the action at high speed.

SUMMARY

The invention comprises a shear valve for opening a pressurized conduit or vessel and includes a housing having a bore for enclosing the valve components, and an entrance and exit port intersecting the housing bore. An elongated valve member is movably positioned within the bore and includes a piston whose components are a shear tool, a pilot pin, and a cylindrical hole whose axis is transversely aligned with the bore axis.

An alignment slot is cut into the side of the piston and a guide lug is secured to the valve housing to assure that the shear tool and the cylindrical hole remain in the required plane. An explosive cartridge is positioned at one end of the bore for creating pressure within the bore for operating the piston and a cylinder head closes the other end of the bore with a central hole therein for supporting the pilot pin.

A threaded nut is attached to an extension of the housing and is adapted to be manually unscrewed from the housing when the valve is to be opened by manual control; the nut enclosing a spring coupled to the pilot pin for moving the piston when released by the nut. In one modification (FIG. 1) the spring is always operative against the pilot pin exerting a force against the piston and frangible fitting, while in a second modification (FIG. 5) the spring is held in check until the nut is turned to become disengaged from the threaded cylinder head extension and breaks the frangible fitting.

A frangible fitting is secured in the entrance port and is formed with a closure disc when extends into a hollow portion of the shear tool thereby retaining the gas or fluid in the vessel when the valve is closed but releasing the gas when the shear tool removes the disc from the frangible fitting.

These features and others, plus additional details of the invention, will be disclosed and discussed more fully in the following description, taken in connection with the accompanying drawings; similar parts having the same numerical designation.

BRIEF DESCRIPTION OF THE FIGURES

FIG. 1 is a cross sectional view of the valve, taken along a median plane, showing the frangible fitting, the piston, and the pilot pin.

FIG. 2 is a cross sectional view of the valve shown in FIG. 1 and is taken along line 2—2 of FIG. 1.

FIG. 3 is a partial cross sectional view of the housing, the piston, and an alignment slot when the valve is closed.

FIG. 4 is a view similar to FIG. 3 when the valve has been opened.

FIG. 5 is a cross sectional view of the valve, similar to FIG. 1, but showing an alternate form of the manually operable nut.

DESCRIPTION OF THE PREFERRED EMBODIMENTS

Referring now to the figures, the valve includes a valve housing 10 having an upper outlet opening 11 and a lower threaded inlet portion 12 for attaching entrance coupling units. The valve housing 10 is formed with a transverse bore 13 which is cylindrical at the position occupied by a piston 14. One end of the transverse bore 13 is closed by a threaded plug 15 which contains an explosive cartridge 16. The charge, which may be a blank cartridge, is exxploded by passing current through two conductors 17. The other end of the transverse bore 13 is closed by an integral cylinder head 18 which is formed with a hole 23 and a threaded reduced diameter extension 21 for engaging a nut 22. The extension has an annular groove for an "O" ring 24. A pilot pin 25, an integral part of the piston 14, guides the piston and other operating components in an axial direction when the valve is opened.

The nut 22, which is illustrated as having an annular slot, includes a compression spring 26. The spring 26 is compressed between the bottom of the annular slot and the surface of a back-up washer 27. The back-up washer 27 is held in place by a snap ring 28 fastened to the pilot pin 25. The nut 22 is provided with a series of slots 30 to be engaged by a spanner wrench when an operator wishes to turn the nut and to start a manual opening of the valve.

When the valve is opened manually by unscrewing the threaded portion of nut 22 the sealing portion of the frangible fitting 34 is sheared off and then the spring 26 pulls the piston 14 away from the threaded plug 15. At the same time a partial vacuum will result between the threaded plug 15 and the piston. To correct this situation, a bleeder hole 31 is drilled in the valve housing so that air can only be admitted to the cylinder bore and the pressure equalized. Importantly the bleeder hole should open abutting the inside of the plug so that no back pressure can develop an hinder the effectiveness of spring 26. A check valve 20 is connected to hole 31 so that air cannot escape from the cylinder. This eliminates leakage after the valve is opened.

Piston 14 is formed integral with an adjoining structure including a cylindrical hole 32 and a shearing tool 33 for breaking away the sealing portion of the frangible fitting 34 to open the valve. Shearing tool 33 is formed with a cylindrical shearing cavity 35 which fits over the sealing portion 34, as indicated in the figures, prior to the opening of the valve. Sealing portion 34 is mounted on a replaceable frangible fitting 36 which is threaded at its outside surface and may be screwed into position prior to the final assembling of parts. The sealing disc 34 is attached to the main body of the frangible fitting 36 by an integral thin circular piece of metal. This piece, for example, may be 0.015 inch thick and 0.013 inch high.

The frangible fitting 36 is mounted in the upper end of an adapter or pipe coupling unit 37 which screws into the lower end of the housing 10. The adapter coupling unit 37 may contain a threaded hole at its side for installing a filling needle valve 40.

The adapter coupling unit may also be fitted with other components such as a safety unit containing a rupture disc for relieving the pressure if it exceeds a predetermined maximum value. In addition, a pressure indicator may be installed at this point. These components are not parts of the invention and will not be described in detail.

The bottom portion of the adapter coupling unit 37 may be threaded for attaching to a storage container, or gas cylinder, the upper neck of which is shown at 38. The inner surface of the adapter coupling unit 37 may be secured to a dip tube supply conduit 39 which extends to the bottom of the pressurized storage container to insure that the denser medium in the container is discharged first.

In order to retain the piston member in alignment during and after the valve opening operation, an alignment slot 41 (FIGS. 2 and 3) is cut in one side of the piston. A screw lug 42 is secured to the housing 10 and is clamped in place by a lock nut 43. At the lower end of the screw lug 42, a detent ball 44 (see FIG. 3) is positioned, held in place by a coiled spring within the body of the screw (not shown). To aid in retaining the piston in its open position, a detent hole 45 is cut in the piston extending from the bottom of alignment slot 41 into the body of the piston 14.

The operation of the valve is as follows: The adapter coupling unit 37 is assembled with its supply conduit 39 (if desired), the filling valve 40 and the frangible fitting 36. Then adapter coupling 37 is connected to a storage container 38 and the container is filled with the desired agent by means of the valve 40. Next, the housing 10 is assembled with all its components and, with the pilot pin 25 held in position shown in FIG. 1, coupling 37 is screwed into the threaded valve housing entrance 12. The valve is now ready for a dispensing operation. An additional pipe, funnel, or nozzle may be attached to the upper outlet opening 11.

If the valve is to be operated automatically, electrical current is applied through conductors 17 to explode the charge whereby the gas pressure is applied to piston 14 which moves to the right, shearing off the sealing disc 34 and thereby placing the hollow cylindrical passage in axial alignment between the opening in the frangible fitting 36 and the outlet opening 11 in housing 10. The fluid contents from the conduit 38 now moves through the valve.

An important feature of this invention is that the sheared off disc is completely retained within the recessed portion of shearing tool 33 and therefore cannot hinder the perfect operation of the valve.

Referring specifically to the modification shown in FIG. 1, if the valve is to be operated manually, a spanner wrench (not shown) is applied to the nut 22 and turned about one-half a revolution. The force of this movement is transmitted through the back-up washer 27, the spring clip 28, and the pilot pin 25, to the shear section 33, shearing off the sealing disc 34. As soon as the disc is free, the spring 26 moves the piston 14 to the open position of the valve. Obviously, bayonet-type screw threads could be used if desired.

When the piston is in its closed position, the alignment lug is in the position shown in FIG. 3. When the piston is in the open position, the alignment lug 42 is at the other end of the slot with the detent ball 44 extending into the detent hole 45 as shown in FIG. 4. This detent prevents closure or bounce and misalignment during the discharge of the controlled media through the valve.

The modified and preferred valve shown in FIG. 5 is similar to the valve shown in FIG. 1 except that the arrangement for operating the valve by manual means is slightly altered. Identical parts carry the same number, while modified parts are designated by a prime or an A mark.

The nut 22' is coupled to the housing extension 21' by a short coarse thread requiring only one or two turns to release the nut. The helical spring 26A is still compressed within an annular slot but in this modified form the slot is open on the left side and the spring presses against a face of the cylinder head 18' of housing 10' so as to become operative only after the nut has been manually turned free of its threaded connection with the housing.

To operate this form of the invention, a spanner wrench is used to turn the nut 22' until the threads are completely disengaged, then the helical spring 26A moves the nut 22 and the pilot pin 25 so that the transverse opening 32 will be placed in alignment with the exit port 11.

From the above description of the valve and its operation, it will be evident that a fast opening, fast discharge valve is available for either automatic or manual operation, and which valve also includes a positive visible indication of its open or closed condition.

What is claimed is:

1. A shear valve for opening a pressurized conduit comprising:

a. a housing including a bore for enclosing valve components, and entrance port, and an exit port intersecting the housing bore;

b. an elongated valve member movably positioned within the bore and including a piston, a shear tool, a pilot pin, and a portion formed with a cylindrical hole whose axis is transversely aligned with the bore axis and adapted to register with said ports;

c. a plug closing one end of the bore including an explosive cartridge for creating pressure within the bore for moving the piston;

d. a cylinder head closing the other end of the bore formed with a central hole therein for supporting the pilot pin;

e. a threaded nut attached to the cylinder head and coupled to said valve member for moving same and adapted to be unscrewed from the head when the valve is to be opened by manual control, and means for moving the elongated valve member when released by said nut, and f. a frangible plug secured in the entrance port and formed with a closure disc for sealing fluid in the entrance port when the valve is unactuated and for releasing fluid when the valve is actuated and the shear tool removes the disc from the frangible plug;

g. and a bleeder hole in communication with the atmosphere and said bore contiguous to said plug whereby when said piston moves slightly atmospheric air will be drawn into said bore.

2. A shear valve as claimed in claim 1 wherein a check valve is connected to said bleeder hole so that air cannot escape from said cylinder bore.

3. A shear valve as claimed in claim 2 wherein said piston is positioned adjacent to the plug.

4. A shear valve as claimed in claim 1 wherein the cylindrical hole is positioned between the piston and the shear tool and is moved into axial alignment with the entrance and exit ports when the tool is actuated.

5. A shear valve as claimed in claim 1 wherein the cylinder head is formed with a threaded extension which meshes with the threaded portion of the nut, said extension arranged in axial alignment with the bore.

6. A shear valve as claimed in claim 1 wherein said piston is retained in its aligned position before, during, and after the opening operation of the valve by means of a longitudinal channel cut in the side of the piston, and an inwardly extending pin secured to the housing which engages the channel.

7. A shear valve as claimed in claim 6 wherein a depression is formed in the bottom of said channel and a resiliently mounted ball is secured to the end of the pin in the channel for moving into the depression and thereby retaining the piston in its operated position after the valve is opened.

8. A shear valve as claimed in claim 2 wherein said moving means is a compression spring and is positioned in a slot in the nut.

9. A shear valve as claimed in claim 1 wherein said means for moving the elongated valve member comprises said threaded nut enclosing a spring bearing on a portion of the valve housing, said spring acting to move the nut, the pilot pin, and the shear tool to an open valve position when the nut has been manually turned free of its threads.

10. A shear valve for opening a pressurized conduit comprising:

a. a housing including a bore for enclosing valve components, an entrance port, and an exit port intersecting the housing bore;

b. an elongated valve member movably positioned within the bore and including a piston, a shear tool, a pilot pin, and a portion formed with a cylindrical hole whose axis is transversely aligned with the bore axis and adapted to register with said ports;

c. a plug closing one end of the bore including an explosive cartridge for creating a pressure within the bore for moving the piston;

d. a cylinder head closing the other end of the bore formed with a central hole therein for supporting the pilot pin;

e. a threaded nut attached to the cylinder head and coupled to said valve member for moving the same and adapted to be unscrewed from the head when the valve is to be opened manually, said threaded nut having a recess facing said cylinder head, and means in said recess acting against the cylinder head and said threaded nut for moving the elongated valve member when released by said nut, and f. a frangible hollow plug secured in the entrance port and formed with a closure disc extending into a hollow portion of the shear tool for sealing fluid in the entrance port when the valve is unactuated and for releasing fluid when the valve is actuated and the shear tool removes the disc from the hollow plug.

11. A shear valve for opening a pressurized conduit comprising:

a. a housing including a bore for enclosing valve components, an entrance port, and an exit port intersecting the housing bore;

b. an elongated valve member movably positioned within the bore and including a piston, a shear tool, a pilot pin, and a portion formed with a cylindrical hole whose axis is transversely aligned with the bore axis and adapted to register with said ports;

c. a plug closing one end of the bore including an explosive cartridge for creating a pressure within th bore for moving the piston;

d. a cylinder head closing the other end of the bore formed with a central hole therein for supporting the pilot pin;

e. a threaded nut attached to the cylinder head and coupled to said valve member for moving same and adapted to be unscrewed from the head when the valve is to be opened by manual control, and means for moving the elongated valve member when released by said nut, and f. a frangible hollow plug secured in the entrance port and formed with a closure disc extending into a hollow portion of the shear tool for sealing fluid in the entrance port when the valve is unactuated and for releasing fluid when the valve is actuated and the shear tool removes the disc from the hollow plug;

g. said threaded nut having an annular recess facing said cylinder head, said moving means comprising spring means positioned in said recess and exerting a controlled force on said nut and said cylinder head which tends to separate said elements.

12. A shear valve as set forth in claim 11 wherein said threaded nut has a limited number of coarse threads at its end whereby when said nut is rotated a short distance it will become disengaged from the cylinder head, and the spring atuomatically will rapidly force the valve to a fully open position.

13. A shear valve as set forth in claim 12 wherein said pilot pin extends from said shear tool and said piston through the central supporting hole in said cylinder head to provide a positive indication of the condition of said shear valve.

14. A shear valve as set forth in claim 1 wherein said pilot pin extends from said shear tool to provide a positive indication of the open or closed position of said shear valve.

15. A shear valve for opening a pressurized conduit comprising:
  a. a housing including a bore for enclosing valve components, an entrance port, and an exit port intersecting the housing bore;
  b. an elongated valve member movably positioned within the bore and including a piston, a shear tool, a pilot pin, and a portion formed with a cylindrical hole whose axis is transversely aligned with the bore axis and adapted to register with said ports;
  c. a plug closing one end of the bore including an explosive cartridge for creating a pressure within the bore for moving the piston;
  d. a cylinder head closing the other end of the bore formed with a central hole therein for supporting the pilot pin;
  e. a threaded nut attached to the cylinder head and coupled to said valve member for moving same and adapted to be unscrewed from the head when the valve is to be opened by manual control, and means for moving the elongated valve member when released by said nut, and
  f. a frangible hollow plug secured in the entrance port and formed with a closure disc extending into a hollow portion of the shear tool for sealing fluid in the entrance port when the valve is unactuated and for releasing fluid when the valve is actuated and the shear tool removes the disc from the hollow plug;
  g. and a bleeder hole in communication with the atmosphere and said bore adjacent said plug whereby when said piston moves atmospheric air will be drawn into said bore, and wherein said means for moving the elongated valve member comprises said threaded nut enclosing a spring bearing on a portion of the valve housing, said spring acting to move the nut, the pilot pin, and the shear tool to an open valve position when the nut has been manually turned free of its threads.

* * * * *